P. A. E. ARMSTRONG.
ROLLER BEARING.
APPLICATION FILED JUNE 13, 1919.
1,376,310.
Patented Apr. 26, 1921.
2 SHEETS—SHEET 1.
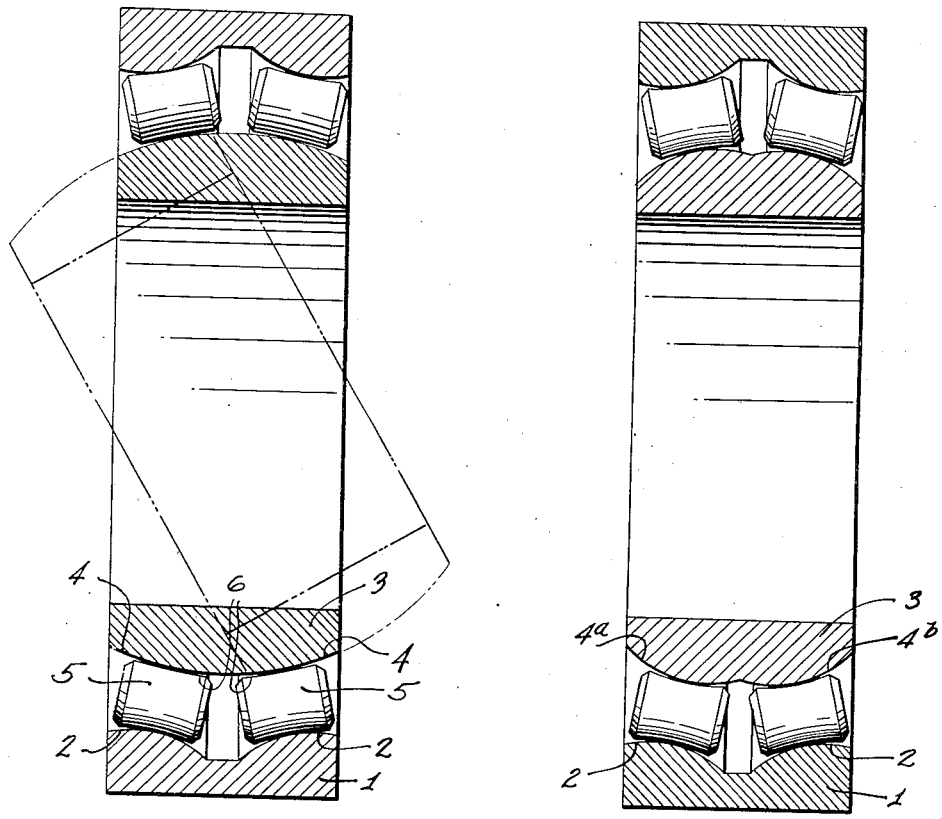
INVENTOR
P.A.E.Armstrong
BY
H.H.Dyke
ATTORNEY

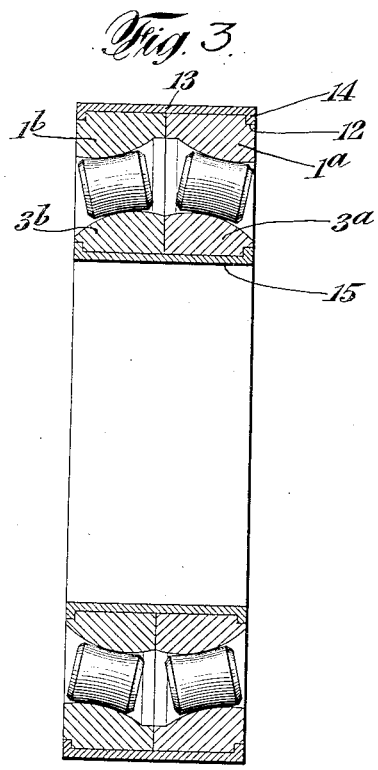
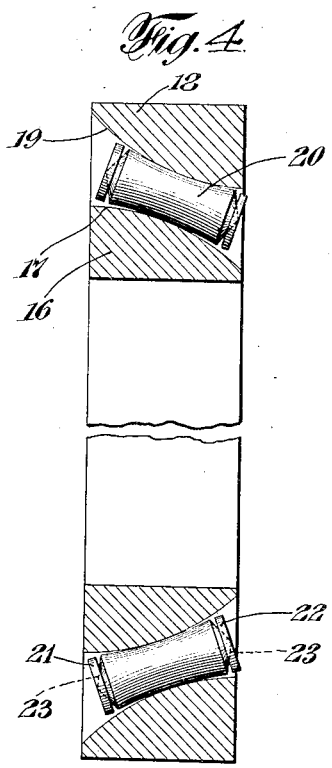
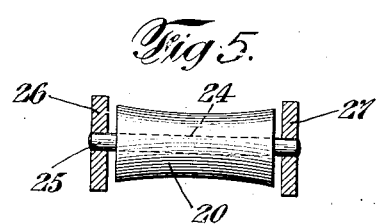

UNITED STATES PATENT OFFICE.

PERCY A. E. ARMSTRONG, OF WATERVLIET, NEW YORK.

ROLLER-BEARING.

1,376,310.  Specification of Letters Patent.  Patented Apr. 26, 1921.

Application filed June 13, 1919. Serial No. 303,886.

*To all whom it may concern:*

Be it known that I, PERCY A. E. ARMSTRONG, a subject of the King of Great Britain, residing at Watervliet, in the county of Albany and State of New York, have invented a certain new and useful Improvement in Roller-Bearings, of which the following is a specification.

My invention relates particularly to bearings which may be used for any desired purpose and in any apparatus in which ball bearings or roller bearings find application.

The invention has for an object to provide roller bearings which have many advantages over ball bearings and roller bearings which have been previously used.

One object of my invention is particularly to provide bearings containing rollers which are so constructed as to have the advantages of large rollers,—that is to say, a smaller pressure per square inch and a more uniform pressure upon the bearing surface under load,—while avoiding the disadvantages of large rollers resulting from the wide separation between the points of support of the rollers in their races; and having very much the same advantages as cylindrical roller bearings, due to the increased area of contact between the rollers and the races, while avoiding the disadvantages of such roller bearings resulting from the increased friction and difficulty in making the rollers because of the straight lines present in the surfaces thereof.

A further object is to provide self-alining bearings of this type.

Another object of the invention is to provide roller bearings of such a character that both the rollers and the races may be readily brought to the exact dimensions desired and in which the dimensions of the same may be easily and accurately measured.

Another object is to so construct the bearings that they will be adapted to act both as thrust bearings and journal bearings.

Further objects of my invention will appear from the detailed description thereof contained hereinafter.

While my invention is capable of embodiment in many different forms, for the purpose of illustration I have shown only certain forms thereof in the accompanying drawings, in which—

Figures 1 to 4 are central sectional views of bearings made in accordance with my invention.

Fig. 5 is a detailed view of a different form of roller and cage.

In Fig. 1 I have shown a bearing comprising an outer race member 1 having a plurality of convex bearing surfaces 2, such surfaces preferably being curved transversely in an arc of a circle. An inner race member 3 is also provided, having a convex bearing surface 4, which I prefer to make spherical so that the bearing may easily be assembled and disassembled by tilting its parts relative to each other. A plurality of rollers 5 are disposed between the outer and inner race members 1 and 3, and the bearing surfaces 6 of such rollers are made concave, being preferably curved longitudinally of the roller in an arc of a circle of greater radius than that of the bearing surfaces 2 and 4. This bearing is self-alining, owing to the curvature of the inner race. Furthermore, the inclination between the two sets of rollers and bearing surfaces enables the structure to perform the functions of a thrust bearing in both directions, as well as the functions of a journal bearing.

In Fig. 2 the construction is the same except that the inner race member 3 is provided with a plurality of bearing surfaces 4ª and 4ᵇ, instead of the single surface 4, each of which bearing surfaces is preferably curved transversely in an arc of a circle, as shown. This bearing is also adapted to act both as a thrust bearing and a journal bearing.

In Fig. 3 I have shown a roller bearing which may be similar to the one previously described in connection with Fig. 2, except that the outer race member is divided into two parts 1ª and 1ᵇ, and the inner race member is divided into two parts 3ª and 3ᵇ. In the form disclosed, each of the parts 1ª and 1ᵇ is cut away to provide a seat 12 for a retaining band 13 having its edges 14 crimped over to engage such seat 12. A similar band 15 may be employed to hold together the inner race members 3ª and 3ᵇ. With a construction of the above character, the rollers and race members may be readily assembled or taken apart for repairs when desired.

In Fig. 4 I have disclosed a bearing adapted to act both as a thrust bearing and a journal bearing. The inner race member 16 is of a diameter progressively increasing from one side to the other, and its outer surface 17 is transversely curved to provide a single race; the outer race member 18 is also provided with a recess of a diameter progressively increasing from one side to the other, and the inner surface 19 of the outer race member is also transversely curved to provide a single race. A plurality of rollers 20 run between the races 17 and 19 and such rollers are transversely curved, preferably with a curvature different from that of the races 17 and 19, so as to bring about a point of engagement between the rollers and the races. In the present form, the races 17 and 19 are convexed transversely, and the rollers 20 are concaved on an arc of greater radius.

This form of bearing will act as a journal bearing and also as a thrust bearing from left to right as the bearing appears in Fig. 4. The bearing may also be easily assembled or disassembled since the inner race member 16 is freely movable into and out of operative position. If one of the races 17 or 19 be made spherical, the bearing will also be self-alining; as shown, the race 17 is made spherical for this purpose.

The form of cage shown in Fig. 4 consists of a pair of rings 21 and 22 having suitable seats to engage the conical ends 23 of the rollers 20.

In Fig. 5 a modified form of cage is disclosed in which the rollers are drilled out to provide axial holes 24 in which pins 25 are received, such pins being suitably secured to the rings 26 and 27.

In all of the above forms, I prefer to employ convex bearing surfaces and concave rollers, since these types are very advantageous to construct. Accuracy in the manufacture of the bearing may be much more readily obtained with such arrangement, than when the bearing surfaces of the race members are concave, the convex bearing surfaces being easily ground and tested with relatively small liability of error. The size of the concave rollers may also be readiy determined so that the bearing may be quickly and reliably brought to the desired dimensions.

While I have described certain specific forms of my invention changes may be resorted to within the scope of my claims without departing from the spirit of my invention.

I claim:—

1. A bearing comprising inner and outer race members each having transversely convex races located at an angle to each other, and two sets of rollers having concave surfaces inclined to each other and adapted to run respectively in said races.

2. A bearing comprising inner and outer race members each having transversely convex races located at an angle to each other, and two sets of concave rollers with surfaces of larger curvature than said races, said sets of rollers being inclined to each other and adapted to run respectively in said races.

3. A bearing comprising inner and outer race members each having transversely convex races located at an angle to each other, and two sets of rollers having concave surfaces inclined to each other and adapted to run respectively in said races, said inner race member having a spherical race engaged by both sets of rollers.

4. A bearing comprising inner and outer race members each having transversely convex races located at an angle to each other, and two sets of concave rollers with surfaces of larger curvature than said races, said sets of rollers being inclined to each other and adapted to run respectively in said races, said inner race member having a spherical race engaged by both sets of rollers.

5. A bearing comprising inner and outer race members each having transversely convex races located at an angle to each other, and two sets of rollers having concave surfaces inclined to each other and adapted to run respectively in said races, said inner race member having a spherical race engaged by both sets of rollers, and said outer race member having two separate races respectively engaging the sets of rollers.

6. A bearing comprising inner and outer race members each having transversely convex races located at an angle to each other, and two sets of concave rollers with surfaces of larger curvature than said races, said sets of rollers being inclined to each other and adapted to run respectively in said races, said inner race member having a spherical race engaged by both sets of rollers, and said outer race member having two separate races respectively engaging the sets of rollers.

7. A combined thrust and journal bearing comprising an inner race member of progressively increasing diameter, the outer surface of such member having a transversely curved race, an annular outer race member having an opening therein of progressively increasing diameter, the inner surface of said outer member also having a transversely curved race, and transversely curved rollers between said races.

8. A combined thrust and journal bearing comprising an inner race member of progressively increasing diameter, the outer surface of such member having a transversely curved race, an annular outer race member having an opening therein of progressively increasing diameter, the inner surface of said outer member also having a transversely curved race, and transversely curved rollers between said races, the race on one of said members being substantially of spherical curvature.

9. A combined thrust and journal bearing comprising an inner race member of progressively increasing diameter, the outer surface of such member being spherical to provide a single curved race, an annular outer race member having an opening therein of progressively increasing diameter, the inner surface of said outer member being transversely convexed on an arc of a circle, and rollers between said races transversely concaved on an arc of a circle of greater radius than the races.

10. A bearing comprising inner and outer race members each made in two parts, the adjacent parts of said race members being provided with races, sets of rollers coöperating respectively with adjacent races and means for securing together the parts of said race members.

11. A bearing comprising inner and outer race members each made in two parts, the adjacent parts of said race members being provided with races, sets of rollers coöperating respectively with adjacent races and retaining bands respectively engaging the parts of the inner and outer race members to hold the same together.

In testimony that I claim the foregoing, I have hereunto set my hand this 5 day of June, 1919.

PERCY A. E. ARMSTRONG.